United States Patent [19]

Nakayama

[11] 4,010,133
[45] Mar. 1, 1977

[54] LOW-FIRE GREEN CERAMIC ARTICLES AND SLIP COMPOSITIONS FOR PRODUCING SAME

[75] Inventor: Takashi Nakayama, Wilmington, Del.

[73] Assignee: E. I. Du Pont de Nemours and Company, Wilmington, Del.

[22] Filed: Mar. 22, 1973

[21] Appl. No.: 343,686

Related U.S. Application Data

[63] Continuation-in-part of Ser. No. 147,215, May 6, 1971, abandoned.

[52] U.S. Cl. .................. 260/29.6 TA; 106/39.5; 260/29.6 T; 260/29.6 H; 260/29.6 M; 260/29.6 MM; 260/42.11; 260/42.13
[51] Int. Cl.$^2$ .................. C08L 33/02; C08K 3/00
[58] Field of Search ... 260/41 B, 29.6 MM, 29.6 M, 260/29.6 TA, 29.6 T, 29.6 H, 42.11, 42.13

[56] References Cited

UNITED STATES PATENTS

| | | | |
|---|---|---|---|
| 2,966,719 | 1/1961 | Park | 260/17 R UX |
| 3,262,900 | 7/1966 | Schreiber | 260/29.6 MM |
| 3,365,631 | 1/1968 | Delaney et al. | 317/258 |

*Primary Examiner*—Lucille M. Phynes

[57] ABSTRACT

Slip compositions for producing green (unfired) ceramic articles exhibiting excellent storage life and fireable to ceramic articles at temperatures substantially below the sintering temperature of barium titanate, said slip composition comprising, in a liquid medium, critical proportionate amounts of $BaTiO_3$, $Fe_2O_3$, certain bismuthate glass frit, and organic polymeric binder. Green ceramic articles and fired ceramic articles made from said slip compositions.

13 Claims, No Drawings

LOW-FIRE GREEN CERAMIC ARTICLES AND SLIP COMPOSITIONS FOR PRODUCING SAME

CROSS-REFERENCE TO RELATED APPLICATION

This application is a continuation-in-part of my now abandoned application U.S. Ser. No. 147,215, filed May 6, 1971.

BACKGROUND OF THE INVENTION

This invention relates to the ceramic substrates for electronic circuitry, and, more particularly, substrates produced by firing at low temperatures.

High dielectric constant ceramic substrates are needed for the production of electronic circuitry. Economics of circuit manufacture dictate that the dielectric substrate and electrode metallization applied thereto be fired simulanteously. Since barium titanate-based materials (a commonly employed dielectric substrate) sinter into coherent dielectric bodies at temperatures in the range 1200°–1400° C., the electrode materials must have high melting points (to preserve pattern definition during firing), and likewise should not react with the substrate during firing. Therefore, expensive high-melting precious metals and alloys thereof have been used as electrodes. For example, U.S. Pat. No. 3,456,313 describes high dielectric constant capacitors using palladium or platinum electrodes. There is a need for dielectric substrates which may be fired at temperatures of 1200° C., or below, and preferably below 1100° C., and, hence, may be employed with lower cost noble metals, such as silver.

SUMMARY OF THE INVENTION

This invention provides green (unfired or unsintered) ceramic articles, such as tapes, which exhibit excellent storage life; the green articles may be fired at or below 1200° C. to sinter the same into coherent ceramic articles. Due to such low firing temperatures, these tapes are compatible with (may be cofired with) silver, silver/palladium and palladium/gold metallizations. Hence, substantial cost savings are present since higher melting metallizations need not be employed. The green ceramic articles are substantially free of solvent, and consist essentially of, by weight, the compositions of Table I, wherein both operable and preferred compositional limits ae set forth. Table II sets forth preferred compositional limits for component (B) of Table I, i.e., the bismuthate glass frit, and Table III for component D, the organic polymeric binder. The inorganic components (A), (B), and (C) must be in finely divided form, that is, they are ball milled to a size that passes through a No. 325 screen (U.S. standard sieve scale), maximum opening 44 microns.

The green ceramic articles (such as tapes) are prepared from slip compositions, also a part of this invention, comprising the amounts of the respective components of Table I, as a slurry in a volatile liquid medium. A preferred liquid medium consists essentially of water where the organic polymeric binder is an acrylate polymer of Section 1, Table III. Specifically, the slip composition is a slurry of finely divided inorganic particulate matter (A), (B) and (C), blended with organic polymeric binder (D) in a liquid medium. At least part of the organic polymeric binder should itself be dispersed in the liquid medium, as explained hereinafter. There may be up to 1%, based upon the inorganic content of the slip composition, of optional surface-active wetting agent (E).

The invention also provides fired or cured ceramic articles which are obtained by forming the slip composition prescribed above; casting the slip composition as a film; drying the film to remove liquid medium; and firing the resultant dried green ceramic tape for a period of time in the range 10 minutes to 64 hours at temperatures in the range 900°–1200° C., and often 900°–1100° c.

DETAILED DESCRIPTION

The slip compositions of the present invention are compounded by mixing together the prescribed inorganic powders, a liquid vehicle, an organic polymeric binder and optionally a wetting agent.

The inorganic powders (particulate matter) consist essentially of components (A), (B) and (C) of Table I, wherein their relative proportions are expressed as percentages of the total inorganic powder. When more than 99% barium titanate is present, the fired ceramic body is too porous; when less than 85% barium titanate is present, the dielectric constant becomes too low.

The bismuthate glass frit has the composition set forth in Table II and is prepared from the prescribed amounts of the respective oxides or precursors thereof by conventional techniques of melting the same to a clear mass (in this instance to temperatures in the range 700°–1200° C,) and then pouring the molten mass into cold water to form a frit. Thereafter, the frit is ball-milled to the desired particle size, specifically, for 1 to 4 hours. Thereafter, the ball-milled product is screened through a No. 325 (or smaller) screen (U.S. standard sieve scale).

In the present invention the barium titanate and iron oxide is similarly finely divided (passes through a No. 325 screen), and, hence, may be ball milled either separately or with the glass frit, as desired.

TABLE I

Green Composition

| Component | | Weight Percentage Operable Range | Preferred Range |
|---|---|---|---|
| Inorganic powder (as % total inorganics): | | | |
| (A) | Barium titanate* | 85–99 | 85–96 |
| (B) | Bismuthate glass frit* | 0.5–10 | 1–6 |
| (C) | $Fe_2O_3$* | 0.5–5 | 0.7–3 |
| Organic materials (wt. expressed as % of wt. of total inorganics): | | | |
| (D) | Organic polymeric binder | 1–15 | 2.5–10 |
| (E) | Surface-active wetting agent | 0–1 | 0.1–0.7 |

*finely divided

TABLE II

BISMUTHATE GLASS FRIT COMPOSITION

| Component | Weight Percentage Operable Range | Preferred Range |
|---|---|---|
| $BiO_3$ | 30–98 | 46–93 |
| PbO | 0–60 | 0–40 |
| $SiO_2/B_2O_3$* | 1–20 | 7–14 |
| Other oxides** | 0–5 | 0–2 |

*Ratio $SiO_2/B_2O_3$ in the range 0 to 2, preferably 0.5–1.5, over one.
**CdO, $WO_3$, $Nb_2O_5$, BaO, SrO, MgO, MnO, ZnO, and/or mixtures thereof.

TABLE III

ORGANIC POLYMERIC BINDER

TABLE III-continued

III-1 Acrylate Polymer

| | Wt. Percentage | |
|---|---|---|
| Component | Operable Range | Preferred Range |
| Alkyl* acrylate ester | 50–75 | 60–70 |
| Alkyl* methacrylate ester | 25–50 | 30–35 |
| Acid (acrylic and methacrylic) | 0.1–2 | 0.1–2 |

*Alkyl is methyl, ethyl, propyl, butyl and 2-ethylhexyl

III-2 Ethylene Copolymers

| Component | Wt. Percentage |
|---|---|
| Ethylene | 20–79.5 |
| Plasticizing comonomer: | 20–79.5 |
| vinyl ester of a lower (1-6 carbon) saturated aliphatic monobasic carboxylic acid; butyl acrylate; vinyl-2-ethyl-hexoate; and/or dibutyl maleate (preferably vinyl acetate) | |
| Crosslinkable comonomer: | 0.5–10 |
| acrylic acid, meth-acrylic acid, N-methylol acrylamide, itaconic acid and/or glycidyl methacrylate | |

The organic polymeric binder is an internally plasticized thermosetting resin and is described chemically in Table III. The term "internally plasticized thermosetting resin" designates a well-known class of thermosetting resins (see pages 875–6, "Technology of solvents and Plasticizers," A. K. Doolittle, Wiley, N.Y., 1954). In general, a thermosetting resin is one which becomes non-flowable and insoluble on heating. In addition, with the internal plasticization, the flexibility is built into the polymer chain and consequently provides permanent flexibility. This is contrasted with externally plasticized resins wherein an external plasticizer is present as a physical mixture and could be eventually lost by volatilization, extraction or oxidation. Thus, the use of these internally plasticized thermosetting resins provides better dimensional stability, better storage stability, better solvent resistance and more permanently plasticized green (unfired) ceramic articles than does the use of prior compositions.

The internally plasticized thermosetting resins are medium to high molecular weight, water-insoluble polymers which give tough, flexible films at room temperature after formation of films or sheets from the slip compositions. Slip compositions containing these resins provide tough, flexible cross-linked films or sheets after being heated at moderately elevated temperatures (50°–150° C.) for short periods of time (up to 15 minutes). Examples of polymers which are useful in this invention are those of Table III. The ethylene copolymers of Table III-2 may include small amounts of acid catalyst to accelerate cross-linking. The cross-linkable comonomer in Table III-2 is capable of cross-linking upon being heated. The acrylate polymers of Table III-1 are also capable of cross-linking on drying, particularly when heated. Acrylate copolymers such as "Rhoplex" E-32 or "Rhoplex" HA-8, described in Rohm & Haas Bulletin TP-125c, are commercially available. The thermosetting resin selected may be high or low in viscosity, but must be volatilizable during firing to form a rigid ceramic. In addition, the resin should provide flexible films which may be stored on rolls without deterioration. Thermosetting resins exhibit a generally acceptable degree of flexibility where their initial modulus is below 30,000 psi. (2110 Kg/cm.$^2$).

An optional ingredient of the slip composition is a surface-active or wetting agent (up to 1% of the solids content of the slip). The present invention may be practiced with either a volatile organic liquid or water as the liquid medium, although the preferred medium consists essentially of water. When water is employed, it is preferred that a wetting agent be employed. An aqueous system is preferred to avoid the difficulties of an organic solvent system including atmospheric pollution, flammability and toxicity. Furthermore, the preparation of aqueous systems and the subsequent handling and formulating of ceramic articles therefrom is much more easily accomplished than with organic solvent systems.

A wide variety of wetting agents for the ceramic particles can be used, such as polyphosphates, tetraphosphates, silicates, monomer organic surfactants such as substituted polyethylene glycols or anionic organic surfactants such as sodium salts of higher aliphatic carboxylic acids (sodium stearate). Water-soluble higher molecular weight materials are effective wetting agents for the ceramic particles and also act as emulsion stabilizers. These include carboxymethylcellulose and its salts, hydroxyethylcellulose, methylcellulose, polyvinyl alcohol, substituted polyvinyl alcohols, polyvinyl pyrrolidone, and protenaceous materials (e.g., casein). The wetting agent in the slip composition facilitates the formation of homogeneously uniform slip compositions having desirable spreadability. Without such an agent, excessive mixing is required and uniform films free of imperfections are difficult to form. With wetting agents, the process of formulating slip compositions and films therefrom becomes suprisingly easy.

The mixing of the constituents of the slip composition (in the amounts prescribed in Table I) may be accomplished in any conventional manner, provided the composition is thoroughly mixed to a homogeneous suspension, in order to avoid undesirable striations, fractures or areas of poor strength in the fired ceramic end product. In certain instances where dispersions of the binder are very stable and contain a rather high level of surface active agent, the inorganic particulate matter can be added directly to the dispersions; agitation should accompany this compounding process. Agglomerates of particles may be broken up by high shear agitation to provide surface smoothness characteristics. However, to insure that the addition of the ceramic particulate does not "shock" the aqueous dispersion of the polymer and cause coagulation, the ceramic particles are often predispersed in water containing a wetting agent and optionally an antifoaming agent, such as octyl alcohol. This ceramic particulate suspension, after high shear treatment and removal of air by stirring under heat and vacuum, is then gently mixed with the aqueous dispersion of the organic polymeric binder. Sometimes after standing for long periods of time, the resulting slip compositions have a slight tendency towards settling of the ceramic particulate. This is of no problem since the particulate is readily dispersed by gentle stirring.

A convenient method of mixing the component is by ball milling the finely divided inorganic powders, the binder, surface-active agent (if any) and the liquid medium (e.g., water) for about 0.5 to 1 hour. The mixed composition is then debubbled under vacuum, cast on a smooth supporting surface by a conventional coating and/or extrusion technique such as doctor blading, casting, etc.

The organic polymeric binder may be soluble to some extent in the volatile liquid medium. However, the concentration of polymer should then exceed its solubilities in the liquid medium, so that at least some polymer is dispersed in the liquid medium. This dispersed polymer, it is thought, prevents settling of the inorganic particles in the slurry and aid in the uniform distribution of polymer and inorganic solids in the resultant green ceramic sheet.

The weight ratio of inorganic material to total liquid medium in the slip composition may vary considerably, but should be as high as possible while still permitting the formation of a good dispersion and ceramic film therefrom. A high ratio of inorganic matter to liquid medium reduces the shrinkage which occurs in the ceramic film during firing. Furthermore, if the film has to be prepared by extrusion techniques, a high viscosity paste is required and the liquid medium level should be very low. More specifically, if the unfired (green) tape is prepared by casting techniques, such as by blade coating, dispersion viscosity values such as 200 cps. (at 100 rpm on the Brookfield viscometer) to 1200 cps. have been found desirable. With the wide variety of coating methods available, viscosity values of 50 to 5,000 cps. (at 100 rpm on the Brookfield viscometer) and up to 20,00 cps. (at 10 rpm on the Brookfield viscometer) are applicable.

The cast article or film is then dried by a conventional drying process (e.g., infrared, air-dry, oven heat) to remove substantially all of the liquid medium. Drying may be accelerated by heating to a temperature up to 150° C.

The film, still in contact with the supporting surface, may be removed from the supporting surface and subjected to further processing steps such as coating, molding, stamping and the like. In the alternative, if the film is on a flexible supporting surface, the film can be rolled and stored in this manner. These well-known techniques are described in U.S. Pat. No. 2,966,719.

The green tape so produced has the composition set forth in Table I. Only traces of liquid medium will remain, after drying. The tape exhibits excellent shelf storage life and minimal swelling is observed. The tape may be cut as desired and printed with metallizations. Since the green tape sinters at low temperature (it is theorized that chemical reactions occur among the inorganic materials), less expensive metallizations such as silver, silver-palladium and palladium-gold may be used to print patterns, and then the printed green tape may be sintered at temperatures in the range 900°–1200° C., for 10 minutes to 64 hours. Of course, the time and temperature is selected to maximize the dielectric properties of the product. Thus, if a low temperature is selected, longer firing times are preferably used; likewise, if a high temperature is used, short firing times such as 10–15 minutes are acceptable.

EXAMPLES

This invention is illustrated by the following examples. In the following examples and elsewhere in this specification and the appended claims, all parts, ratios and percentages of materials or components are by weight.

Dielectric constants (K) were determined as follows:

$$K = \frac{Cd}{0.0885 A}, \text{ where}$$

C = capacitance in pf,
A = electrode area in $cm^2$ and
d = dielectric thickness in cm.

Dissipation factors (DF) were determined as follows:

$$DF = \tan \text{delta} = \frac{1}{Q} \text{ where}$$

delta = loss angle and
Q = quality factor

The glass frits employed in the examples were prepared as follows. The oxides were weighed out and mixed. The mixture was melted at 700°–1200° C. in a kyanite crucible to form a clear homogeneous melt; the molten glass was poured into cold water to form a frit; and the frit was ground in a ball mill jar equipped with the normal complement (half full) of grinding medium (ceramic balls) and the proper weight of water until less than 1% residue was retained on a No. 400 sieve (U.S. standard sieve scale).

The barium titanate and $Fe_2O_3$ used in the examples were also milled to pass through a No. 400 sieve.

EXAMPLES 1–17

Ceramic articles (tapes) were prepared in each of Examples 1–17, as follows. Glass frits 1–17, having the compositions set forth in Table IV, were compounded with barium titanate and iron oxide in the following manner. In each of Examples 1–17 there was placed in a ball mill 57.56 parts of an inorganic powder containing 95 parts barium titanate, 2.5 parts $Fe_2O_3$ and 2.5 parts of the respective frit of Table IV; 5.77 parts of a 2% aqueous solution of methyl cellulose as surface active agent (Dow "Methocel" 65HG); 6.00 parts of a 46% aqueous solution of polyacrylic ester as binder (Rohm & Haas "Rhoplex" E-32, a resin within Table III-1); and 30.68 parts water as liquid medium.

The mixture was ball milled for about ½ to 1 hour, then debubbled by vacuum. The resultant slip composition was poured onto a flexible polyethylene coated DuPont "Mylar" polyester film base and doctor bladed thereon with a doctor blade set for a 10-mil gap. After drying at 80°–90° C. for 15–45 minutes, the resultant product was a 4-mil thick green ceramic sheet.

In each example the green sheet was cut to a 1.2-inch square and metallized by screen printing (325 mesh) a silver paste (3 parts silver per part inert liquid vehicle) at a thickness of 0.5 mil. The area of the electrode was 0.160 inch by 0.093 inch. The metallized ceramic tapes were then stacked in the desired order and laminated by press to a monolithic structure. The laminated structure was fired by raising the temperature from room temperature to 500° C. at a rate of less than 10° C. per minute to burn off organic materials. Then the temperature was raised to 930° C. and held there for 30 minutes. Dielectric constant and dissipation factor were then determined on each sample and are reported in Table IV.

EXAMPLE 18

The effect of the presence of iron oxide on dielectric constant and dissipation factor is shown by the two runs of this example. In each run the glass frit of Example 4 was used. The tape preparation procedure of Examples 1-17 was used to prepare metallized substrates, except as indicated below.

In Run A the following were placed in a ball mill to prepare a slip composition: 53.3 parts water; 10.0 parts of a 2% aqueous solution of methyl cellulose as a surface active agent (Dow "Methocel" 64 HG); 85.44 parts barium titanate; 0.96 parts frit; and 10.1 parts of a 40% aqueous solution of polyacrylic ester as a binder (Rohm & Haas "Rhoplex" E-32).

In Run B, the tape was prepared from the following components: 53.3 parts water; 10.0 parts of the 2% aqueous solution of methyl cellulose; 88.8 parts barium titanate; 2.4 parts $Fe_2O_3$; 4.8 parts glass frit; and 10.1 parts of the aqueous solution of polyacrylic ester.

The tapes were metallized using a palladium/gold metallization containing 10 parts Pd and 90 parts Au; there were 3 parts metal to 1 part inert liquid vehicle.

The metallized tapes of Runs A and B were each fired at 1050° C. for 30 minutes. In Table V it is seen that the dielectric constant of Run B, in which the inorganic powder contains $Fe_2O_3$, frit and barium titanate, is substantially improved over that of Run A (barium titanate and frit). In contrast to the excellent results reported in Table V, when a tape containing barium titanate as the sole inorganic component was fired at the same time and temperature, the resultant product was so porous that it readily disintegrated.

TABLE V

| | Example 18 Inorganic Powder Composition (wt. %) | | | Properties at 1 KHz. | |
|---|---|---|---|---|---|
| Run No. | $BaTiO_3$ | Glass Frit | $Fe_2O_3$ | K | DF (%) |
| A | 95 | 5 | 0 | 1210 | 1.7 |
| B | 92.5 | 5 | 2.5 | 1650 | 3.6 |

EXAMPLES 19-25

Additional metallized substrates were prepared from green ceramic tapes of the present invention in the manner prescribed in Examples 1-17, in each of Examples 19-25. The metallization employed is specified in Table VI (each metallization was printed as a paste containing 3 parts metal to 1 part inert liquid vehicle), as are the firing conditions and the dielectric constant and dissipation factor of the resultant product. The inorganic composition contained 92.5% $BaTiO_3$, 2.5% $Fe_2O_3$ and 5.0% frit; the frit contained 82.0% $Bi_2O_3$, 11.0% PbO, 3.5% $SiO_2$ and 3.5% $B_2O_3$. The materials introduced into the blender were the same as in Run B of Example 18.

TABLE VI

Examples 19-25

| Example | Metal Paste | Firing Conditions | K | DF (%) |
|---|---|---|---|---|
| 19 | Pd-Au* | 900° C., 4 hr. | 1050 | 3.2 |
| 20 | Au | 950° C., 1 hr. | 850 | 2.1 |
| 21 | Pd-Au* | 950° C., 1 hr. | 1180 | 2.0 |
| 22 | Pd-Au* | 1000° C., 1 hr. | 1425 | 3.4 |
| 23 | Au | 1000° C., 1 hr. | 1425 | 3.3 |
| 24 | Pd-Au* | 1050° C., ½ hr. | 1650 | 3.6 |
| 25 | Pd-Au* | 1100° C., ¼ hr. | 1550 | 2.8 |

*10 Pd/90 Au.

EXAMPLE 26

TABLE IV

| Example | Glass Frit Composition (wt. %) | | | | | | | | | | | | Properties at 1 KHz. | |
|---|---|---|---|---|---|---|---|---|---|---|---|---|---|---|
| | $Bi_2O_3$ | PbO | $SiO_2$ | $B_2O_3$ | CdO | $WO_3$ | $Nb_2O_5$ | BaO | SrO | MgO | MnO | ZnO | Dielectric Constant | DF (%) |
| 1 | 93.0 | 0 | 5.5 | 3.5 | — | — | — | — | — | — | — | — | 785 | 2.0 |
| 2 | 86.0 | 0 | 7.0 | 7.0 | — | — | — | — | — | — | — | — | 818 | 2.4 |
| 3 | 87.5 | 5.5 | 3.5 | 3.5 | — | — | — | — | — | — | — | — | 850 | 2.3 |
| 4 | 82.0 | 11.0 | 3.5 | 3.5 | — | — | — | — | — | — | — | — | 728 | 2.3 |
| 5 | 75.0 | 11.0 | 7.0 | 7.0 | — | — | — | — | — | — | — | — | 717 | 1.9 |
| 6 | 73.0 | 20.0 | 3.5 | 3.5 | — | — | — | — | — | — | — | — | 736 | 1.8 |
| 7 | 66.0 | 22.0 | 7.0 | 7.0 | — | — | — | — | — | — | — | — | 820 | 1.7 |
| 8 | 53.0 | 40.0 | 3.5 | 3.5 | — | — | — | — | — | — | — | — | 710 | 2.2 |
| 9 | 46.0 | 40.0 | 7.0 | 7.0 | — | — | — | — | — | — | — | — | 782 | 2.1 |
| 10 | 80.0 | 11.0 | 3.5 | 3.5 | 2.0 | — | — | — | — | — | — | — | 928 | 3.0 |
| 11 | 80.0 | 11.0 | 3.5 | 3.5 | — | 2.0 | — | — | — | — | — | — | 894 | 2.7 |
| 12 | 80.0 | 11.0 | 3.5 | 3.5 | — | — | 2.0 | — | — | — | — | — | 965 | 6.2 |
| 13 | 80.0 | 11.0 | 3.5 | 3.5 | — | — | — | 2.0 | — | — | — | — | 863 | 2.9 |
| 14 | 80.0 | 11.0 | 3.5 | 3.5 | — | — | — | — | 2.0 | — | — | — | 837 | 2.3 |
| 15 | 80.0 | 11.0 | 3.5 | 3.5 | — | — | — | — | — | 2.0 | — | — | 975 | 3.0 |
| 16 | 80.0 | 11.0 | 3.5 | 3.5 | — | — | — | — | — | — | 2.0 | — | 800 | 3.2 |
| 17 | 80.0 | 11.0 | 3.5 | 3.5 | — | — | — | — | — | — | — | 2.0 | 827 | 3.5 |

Three silver metallized substrates were prepared from green ceramic tapes of the present invention in the manner described in Examples 1-17, except that the following was the composition of the inorganic powder: 94.0 parts barium titanate, 1.0 part $Fe_2O_3$ and 5.0 parts glass frit. The glass frit was that of Example 4 (Table IV).

The following were the contents of the blender: 53.3 parts water; 10.0 parts of the 2% aqueous solution of methyl cellulose; 92.4 parts barium titanate; 0.96 part $Fe_2O_3$; 4.80 parts frit; and 10.1 parts of the 46% aqueous solution of polyacrylic ester.

After organic materials were burned off as in Examples 1-17, each of the three laminated metallized tapes was fired at 920° C. for four hours. The average dielectric constant at 1 KHz. was 1258, and the dissipation factors were in the range 2.8-3.1%.

EXAMPLE 27

Sintered metallized structures of the present invention were prepared in the manner set forth in Examples 1-17. A vinyl ester copolymer of Table III-2 was used, 67% ethylene, 28% vinyl acetate and 5% methacrylic acid. The inorganic materials were ball milled for 30 minutes (92.5 parts barium titanate, 2.5 parts $Fe_2O_3$ and 2.5 parts bismuthate glass); 65 parts of the above inorganic mixture was then blended in a glass bead mill with 35 parts of a mixture of the following: 14.5 parts of the above vinyl ester polymer, 84.6 parts perchloroethylene and 0.88 parts Union Carbide Tergitol X-D polyalkylene glycol ether surfactant; 4 additional parts of perchloroethylene were added during milling.

Since it is obvious that many changes and modifications can be made in the above-described details without departing from the nature and spirit of the invention, it is to be understood that the invention is not to be limited to said details except as set forth in the appended claims.

I claim:

1. In a slip composition for formation of green ceramic articles, a slurry comprising a finely divided inorganic powder blended with an organic polymeric binder and a volatile liquid medium; wherein said inorganic powder consists essentially of, by weight,
    A. 85–99% barium titanate,
    B. 0.5–10% bismuthate glass frit, and
    C. 0.5–5% $Fe_2O_3$;
components (A), (B) and (C) being sufficiently finely divided to pass through a No. 325 screen, and said organic polymeric binder is 1–15% of the weight of the inorganic powder; said organic polymeric binder being selected from the class consisting of, by weight,
    1 acrylate copolymers of 50–75% alkyl acrylate ester, 25–50% alkyl methacrylate ester, and 0.2–2% acrylic acid and methacrylic acid, wherein in said esters alkyl is one or more radicals selected from among methyl, ethyl, propyl, butyl or 2-ethylhexyl;
    2. ethylene copolymers of
        i. 20–79.5% ethylene;
        ii. 20–79.5% of one or more comonomers from among vinyl esters of saturated 1–6 carbon atoms aliphatic monobasic carboxylic acids; butyl acrylate; vinyl-2-ethylhexoate; and dibutyl maleate; and
        iii. 0.5–10% of one or more comonomers from among acrylic acid, methacrylic acid, N-methylol acrylamide, itaconic acid; and glycidyl methacrylate;
    3. and mixtures of (1) and (2); said slip composition on drying producing green ceramic articles which exhibit excellent storage life and which are fireable to ceramic articles at temperatures substantially below the sintering temperature of barium titanate.

2. A slip composition according to claim 1 wherein said volatile liquid medium consists essentially of water and said organic polymer binder is said acrylate copolymer.

3. A slip composition according to claim 2 wherein the inorganic powder consists essentially of, by weight,
    A. 85–96% barium titanate,
    B. 1–6% frit, and
    C. 0.7–3% $Fe_2O_3$;

and wherein there is present 2.5–10% of said binder and 0.1–0.7% of said surface-active agent, each based upon the weight of the inorganic powder.

4. A slip composition according to claim 3 wherein glass frit (B) consists essentially of, by weight,
    30–98% $Bi_2O_3$,
    0–60% PbO,
    2–20% total $SiO_2$ and $B_2O_3$, wherein the ratio $SiO_2/B_2O_3$ is in the range 0 to 2, and
    0–5% CdO, $WO_3$, $Nb_2O_5$, BaO, SrO, MgO, MnO, ZnO and mixtures thereof.

5. A slip composition according to claim 4 wherein frit (B) consists essentially of, by weight,
    46–93% $Bi_2O_3$
    0–40% PbO
    7–14% total $SiO_2$ and $B_2O_3$, wherein the ratio $SiO_2/B_2O_3$ is in the range 0 to 2, and
    0–2% CdO, $WO_3$, $Nb_2O_5$, Bao, SrO, MgO, MnO, ZnO and mixtures thereof.

6. A slip composition according to claim 1 wherein said organic polymer binder is said ethylene copolymer.

7. A slip composition according to claim 1 wherein in said ethylene copolymer the comonomer (2) (ii) is vinyl acetate.

8. Green ceramic articles which exhibit excellent storage life and are fireable at temperatures substantially below the sintering temperature of barium titanate to produce ceramic articles, consisting essentially of, by weight, an intimate mixture of a finely divided inorganic powder of
    A. 85–99% barium titanate,
    B. 0.5–10% bismuthate glass frit, and
    C. 0.5–5% $Fe_2O_3$; and
1–15%, based on the weight of the inorganic powder, of the organic polymeric binder of claim 1.

9. Articles according to claim 8 wherein glass frit (B) consists essentially of, by weight,
    30–98% $Bi_2O_3$
    0–60% PbO
    2–20% total $SiO_2/B_2O_3$, wherein the ratio $SiO_2/B_2O_3$ is in the range 0 to 2, and
    0–5% CdO, $WO_3$, $Nb_2O_5$, BaO, SrO, MgO, MnO, ZnO and mixtures thereof.

10. Articles according to claim 9 wherein glass frit (B) consists essentially of
    46–93% $Bi_2O_3$,
    0—40% Pbo,
    7–14% total $SiO_2$ and $B_2O_3$, wherein the ratio $SiO_2/B_2O_3$ is in the range 0 to 2, and
    0–2% CdO, $WO_3$, $Nb_2O_5$, BaO, SrO, MgO, MnO, ZnO and mixtures thereof.

11. Articles according to claim 8 wherein the organic polymeric binder is said acrylate copolymer.

12. Articles according to claim 8 wherein the organic polymeric binder is said ethylene copolymer.

13. Articles according to claim 8 consisting essentially of, by weight, an inorganic powder of
    A. 85–96% barium titanate
    B. 1–6% bismuthate glass frit and
    C. 0.7–3% $Fe_2O_3$
and, based on the weight of the inorganic powder,
    D. 2.5–10% organic polymeric binder and
    E. 0.1–0.7% surface-active agent.

* * * * *